United States Patent

[11] 3,604,901

| [72] | Inventors | Tadao Morita<br>Kyoto;<br>Kazuhiro Kawahara, Amagasaki, both of, Japan |
|---|---|---|
| [21] | Appl. No. | 881,416 |
| [22] | Filed | Dec. 2, 1969 |
| [45] | Patented | Sept. 14, 1971 |
| [73] | Assignee | Omron Tateisi Electronics Co.<br>Kyoto, Japan |
| [32] | Priority | Dec. 5, 1968 |
| [33] | | Japan |
| [31] | | 43/106286 |

[54] INFORMATION CARD
11 Claims, 4 Drawing Figs.

[52] U.S. Cl. ..................................................... 235/61.12 R
[51] Int. Cl. ...................................................... G06k 19/02
[50] Field of Search........................................... 235/61.12
R, 61.12 N; 340/149 A

[56] References Cited
UNITED STATES PATENTS

| 2,373,540 | 4/1945 | Carver.......................... | 235/61.12 N |
| 2,545,804 | 3/1951 | Butler........................... | 235/61.12 N |
| 3,308,010 | 3/1967 | Engelhardt et al............ | 235/61.12 N |
| 3,387,265 | 6/1968 | Smelman...................... | 340/149 A |
| 3,453,598 | 7/1969 | Schweizer..................... | 340/149 A |
| 3,508,031 | 4/1970 | Cooper, Jr.................... | 340/149 A |

*Primary Examiner*—Daryl W. Cook
*Attorney*—Christensen, Sanborn & Matthews

ABSTRACT: An information card for use in sales transactions, bank deposits or withdrawals and the like, which comprises a bottom layer of a light opaque material having holes formed therein to express a predetermined coded information such as the card identification number and the like, an intermediate layer of a translucent thermoplastic material on said information layer and a top layer of a transparent material covering said intermediate layer for protection of the upper surface thereof. These three layers are formed into a single card of laminated construction. The translucent material of the intermediate layer has a softening point much lower than those of the other layers, so that when heated and compressed for lamination, it flows into and fills the information holes in the bottom layer. The material filling the holes reinforces the bottom layer and consequently the card which would otherwise become very weak due to the presence of many holes and yet permits sufficient light to pass through the holes, so that with the other area of the bottom layer being substantially light opaque, very accurate photoelectric detection of the information holes can be achieved.

PATENTED SEP 14 1971  3,604,901

TADAO MORITA
KAZUHIRO KAWAHARA
INVENTOR

BY Christensen,
Sanbow & Watkins
ATTORNEY

INFORMATION CARD

This invention relates to information cards such as credit cards which are widely used for sales transactions, bank deposits or withdrawals and the like.

In recent years, credit sales systems have become very popular in transactions in hotels, restaurants, department stores and various other establishments. In such credit sales systems, various types of information cards are used to identify the owner of the cards and/or the account against which transactions are to be charged. In some cases such informations are recorded on the card by means of light-transmitting holes formed therein in accordance with a predetermined coded arrangement. These information holes are read by a suitable electronic data processor, and such reading is generally conducted photoelectrically. For example, a photosensor such as a cds element is arranged in an opposed relation to a light source, so that as the card is passed between the light source and the photosensor, the latter detects the light passing through the information holes in the card. In this case, the accuracy with which reading of the information holes is conducted is proportional to the difference in the rate of light transmission or light transmittance between the light-transmitting holes and the light opaque portion of the information layer.

One well-known card of the type comprises a plurality of sheets laminated into a multilayer assembly, and in order to increase the above-mentioned difference in light transmittance the information sheet or layer is composed of a light opaque sheet having light-transmitting information holes formed therein and laminated between a pair of transparent protective sheets. Such sheets, whether opaque or transparent, are generally of thermoplastic material, and heat and pressure are generally applied to the sheets for lamination. In that case, heat is likely to soften the material of the opaque sheet thereby deforming the information holes formed therein. If the holes are so small as to conceal them from view, such deformation will often result in disappearance of some or all of the information holes. If the holes are of a larger diameter, provision of many such holes in a comparatively thin sheet weakens the sheet and consequently shortens the life of the card.

To avoid such deformation of the holes, a sheet of paper with information holes punched out may be substituted for the sheet of plastic material. However, the card is likely to be damaged or broken and has a short longevity because the protective layers are likely to be stripped off from the paper sheet.

Accordingly, it is one object of the invention to provide a new and improved information card which is completely free from the above mentioned and other defects of prior art cards of the type.

Another object of the invention is to provide a new and improved information card in which the difference in light transmittance between the light-transmitting areas or holes of the card and the light opaque portion thereof is greatly increased for accurate photoelectric detection of the light-transmitting areas.

Still another object of the invention is to provide such an information card as aforesaid which has a very high mechanical strength and can endure long use.

The above and other objects of the invention will become apparent from the following detailed description of one preferred embodiment thereof with reference to the accompanying drawings, wherein.

Figure 1:
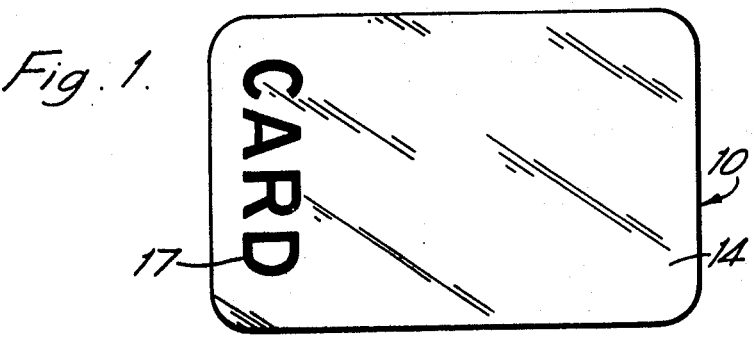
FIG. 1 is a plan view of the obverse of the card.

Briefly, the card of the present invention provides information recorded therein in the form of light-transmitting areas or holes arranged in accordance with a predetermined code. The card is a multilayer assembly which comprises an opaque information layer, a translucent intermediate layer on the upper surface of the information layer, and a transparent protective layer on the upper surface of the intermediate layer. These layers are heated and compressed into a laminated unitary construction. The information layer may be made of a suitable plastic material such as vinyl chloride containing a suitable powdered, preferably nonmagnetic material such as carbon powder so as to render the layer light opaque. Holes are formed in the layer in a coded array to give the card necessary information. The intermediate layer is made of a suitable translucent thermoplastic material having a lower softening point than the information layer and is laminated on the upper surface of the opaque information layer. When the two layers are pressed together while applying heat thereto, the material of the translucent layer flows into and fills the information holes in the bottom information layer. It seldom happens that the material of the intermediate layer will flow out of the bottom surface of the information layer. Since the information holes are filled with and reinforced by the translucent material, the provision of many large holes in the information layer does not reduce the mechanical strength of the layer and consequently the whole card. The information layer is sufficiently light opaque due to the addition thereto of the opaque-powered material to substantially block light while the information holes are sufficiently light transmitting despite the filler material, so that very accurate photoelectric detection of the information holes can be achieved.

Referring now in detail to the drawings, there is shown a card 10 comprising an intermediate layer 12 laminated between a bottom or lower information layer 13 and a top or upper protective layer 14. The intermediate layer 12 is made of a suitable translucent plastic material, say, vinyl chloride which can be softened by applying heat thereto. The adjective word "translucent" is used in this specification and claims to mean that the material transmits light therethrough but conceals from view things at the opposite side of the material; the word "opaque," to mean that the material substantially prevents transmission of light therethrough; and the word "transparent," to mean that the material transmits light therethrough and allows things at one side of the material to be seen therethrough from the other side.

The information layer 13 is also made of a plastic material such as vinyl chloride containing an additive of light opaque, nonmagnetic-powered material, such as carbon powder in an amount sufficient to substantially block light transmission through the layer. A sheet made of white vinyl chloride powder with an additive of carbon powder by heating and compressing the materials into a required form will appear a little dark in color. However, if powdered titanium oxide is added to the above materials, the sheet will substantially regain the original white color of the vinyl chloride without materially decreasing the light-blocking effect of the sheet.

The information layer 13 is formed with a plurality of holes 15 arranged in accordance with a predetermined code to record on the layer the necessary information such as the identification number of the card. The diameter and number of the holes are variable and can be greater than in the prior art cards without substantially reducing the mechanical strength of the card, for reasons to be given hereinafter.

Figure 2:
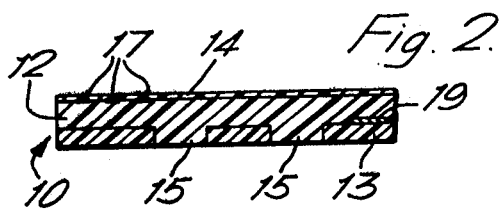
FIG. 2 is a fragmentary sectional view taken along line 2—2 in FIG. 4 illustrating the laminated construction of the card.
Figure 3:
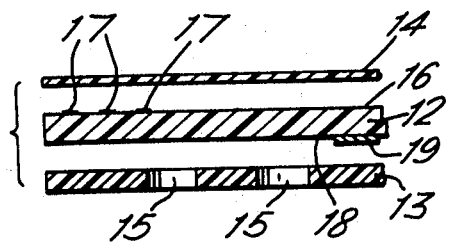
FIG. 3 is a view similar to FIG. 2, but showing the component layers before they are put together.
Figure 4:
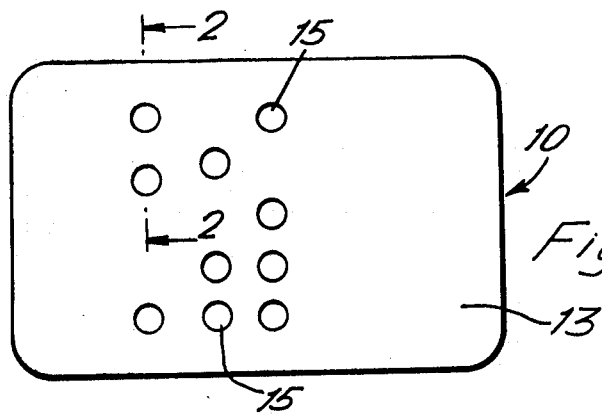
FIG. 4 is a plan view of the reverse of the card.

On the upper surface 16 of the intermediate layer 12 there are printed as at 17 in FIGS. 1 and 2 letters or symbols expressing the name of the owner and/or the identification number of the card, and the like. On the under surface 18 of the intermediate layer 12 and in the area other than that where the holes are formed, there is provided a fraud-preventing element 19 to give the card authenticity or genuineness. When the layers 12 and 13 are put together, the element 19 is concealed from view, but the location of the element must be substantially the same in different cards. When the cards is used in, say, an automatic-vending machine, the element 19 is detected by a suitable detector provided in the machine slit, whereupon the card is accepted and passed to a card information reader. To enable magnetic detection of the element 19, it is made of a magnetic material, and for electrostatic detection, the element may be made of any suitable material.

The intermediate layer 12 with the printed symbols 17 and the fraud-preventing element 19 on the upper and lower surfaces thereof, respectively, is sandwiched between the upper transparent protective layer 14 and the lower information layer 13. The material of the intermediate layer has a softening point sufficiently lower than the other layers 13 and 14. The three layers put together in the above-mentioned manner are then heated and compressed into a card of laminated unitary construction. During the course of applying heat and pressure, the material of the intermediate layer 12 is softened by heat and part of the material flows into and fills the information holes 15 in the bottom layer 13. However, the material does not flow through the holes to come out of the bottom surface of the layer 13, but stays therein thereby restoring flatness all over the bottom surface of the layer 13 which was once broken by the formation of the information holes. Since the plastic material filling the holes 15 is translucent, it does not materially prevent transmission of light through the holes, but rather reinforces the holes and consequently the layer 13 and the whole card.

Thus, in accordance with the invention, since the information layer 13 is light opaque with the information holes being filled with translucent material, the difference in light transmittance between the information holes 15 and the other areas of the information layer 13 is kept great so that accurate photoelectric detection of the holes can be achieved. The translucent material of the intermediate layer filling the information holes gives the card a generally opaque appearance that makes it difficult to locate the holes at first glance, and yet permits light to pass through the holes in an amount sufficient for photoelectric detection thereof. Since the information holes are filled and reinforced with the material of the intermediate layer, the holes may be made of a large diameter and there may be provided a considerably large number of holes and yet the information layer and consequently the card can retain substantially the same mechanical strength as if there were no such holes. As the information holes can be of a large diameter, deformation of the holes if any caused by the process of lamination will have no adverse effect on the photoelectric detection of the holes and there is no danger that the holes will disappear due to such deformation as is often the case with smaller holes in some prior art cards of the type.

What we claim is:

1. An information card comprising a first sheet of a light opaque material formed with a plurality of holes arrayed in accordance with a predetermined code so as to express predetermined information, and a second sheet of a thermoplastic material having a softening point lower than that of said first sheet, said first and second sheets being compressed, while applying heat thereto, into a laminated unitary construction, with part of said second sheet material having flown into said holes in said first sheet to fill them.

2. The information card of claim 1, wherein said second sheet is translucent.

3. The information card of claim 1, wherein said first sheet material is vinyl chloride containing an additive of carbon powder.

4. The information card of claim 3, wherein said first sheet material contains a further additive of titanium oxide powder.

5. The information card of claim 1, wherein said second sheet material is vinyl chloride.

6. The information card of claim 2, further including an element which gives said card authenticity and by which said card can be distinguished from false cards.

7. The information card of claim 6, wherein said element is electrically detectable.

8. The information card of claim 6, wherein said element is magnetically detectable.

9. The information card of claim 6, wherein said element is sandwiched between said first and second sheets in an area thereof not overlapping the area in which said holes are formed.

10. The information card of claim 2, further including symbols visibly expressing a predetermined information and printed on the surface of said second sheet opposite to the surface thereof contacting said first sheet.

11. The information card of claim 10, further including a third sheet of transparent material covering said second sheet surface for protection thereof.